Figure 1:
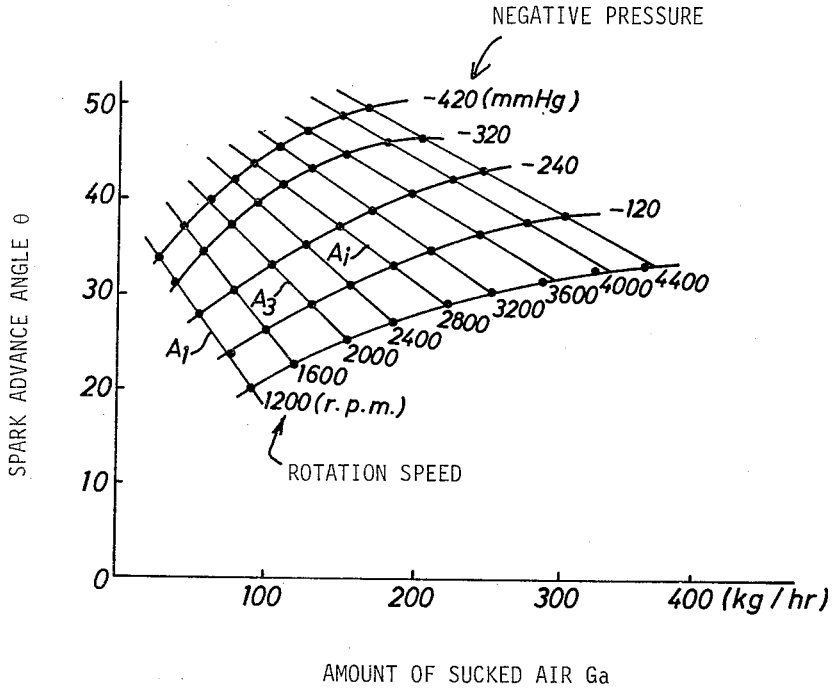
Figure 2:
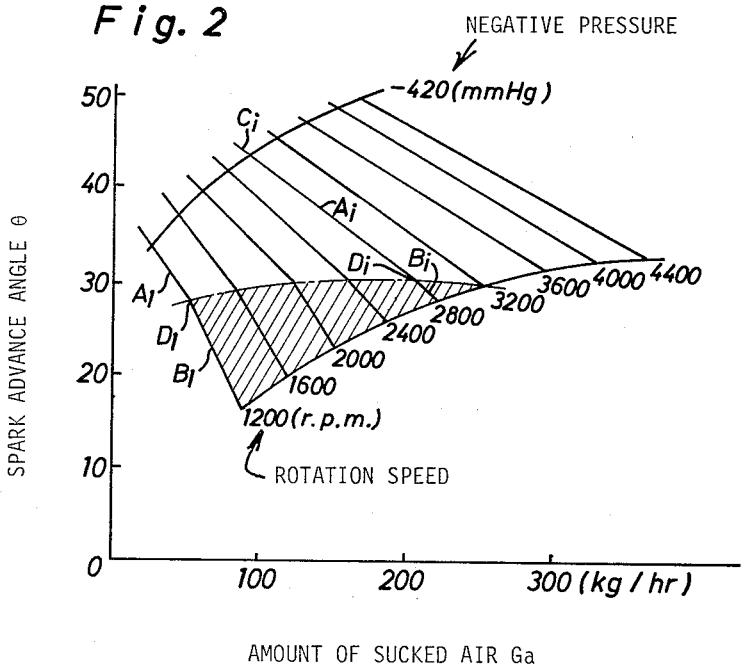
Figure 3:
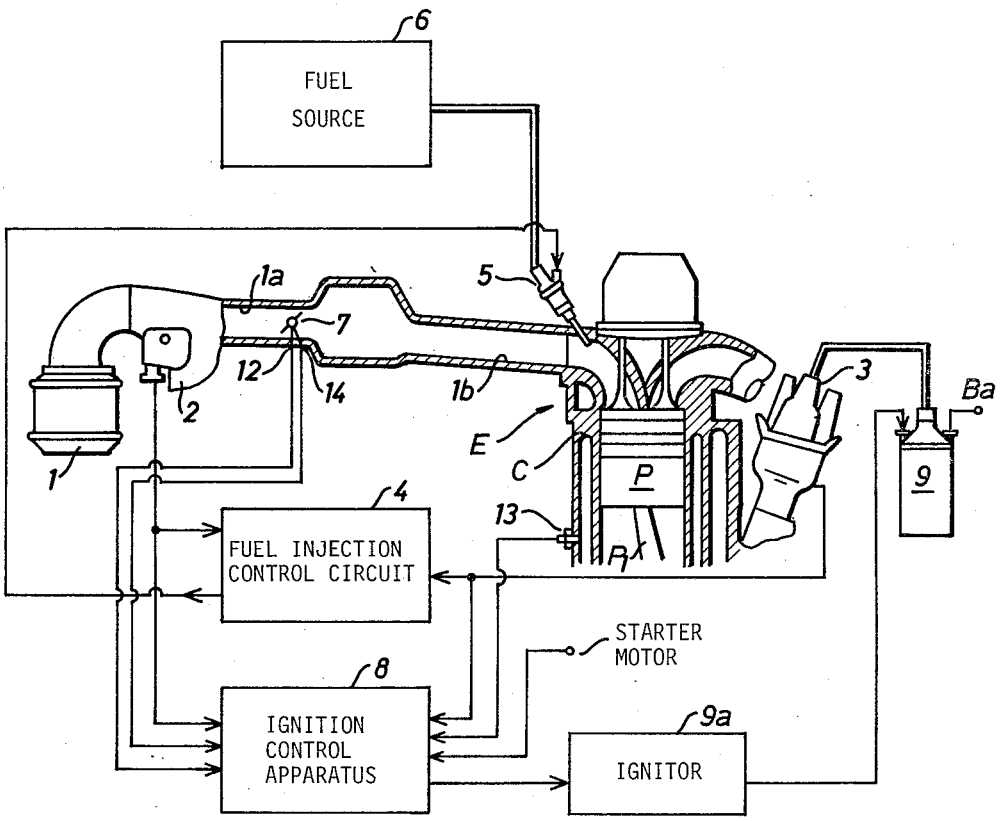
Figure 5:
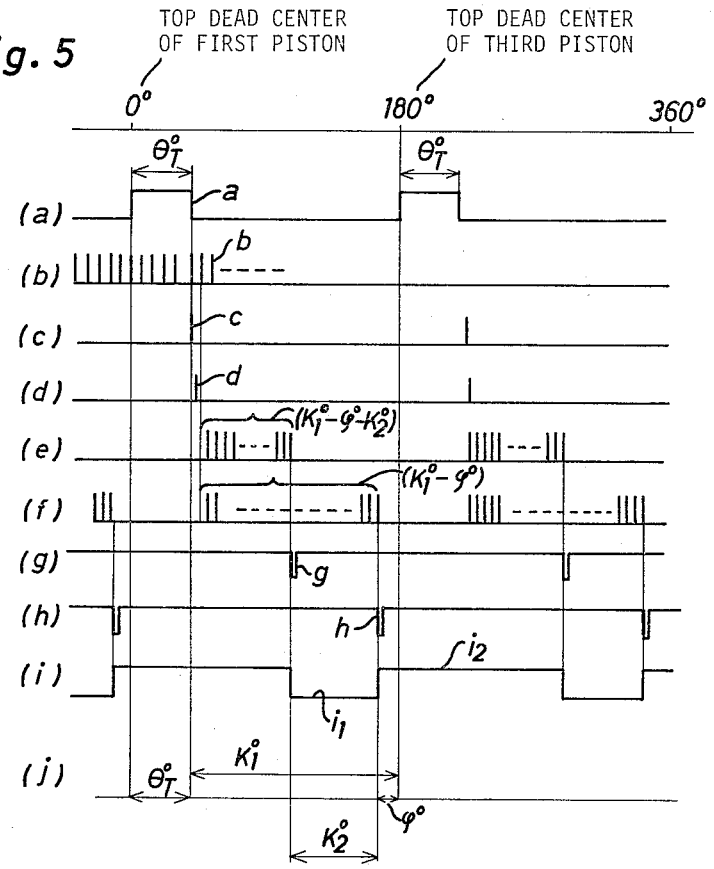
Figure 6:
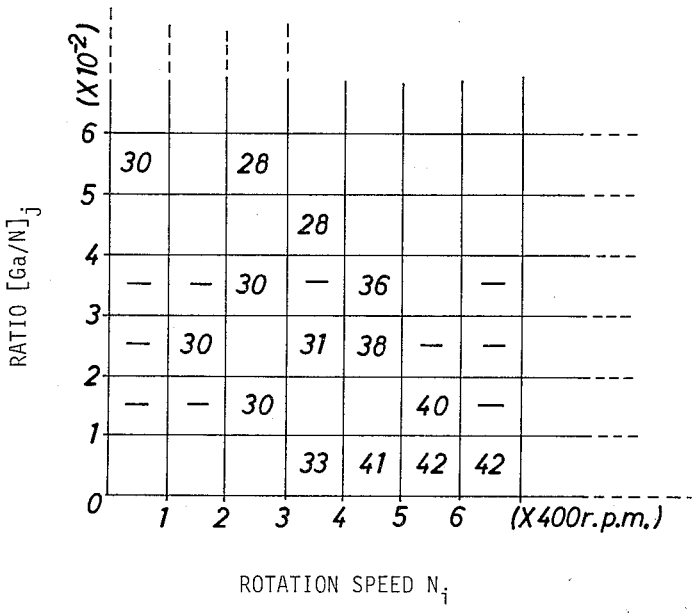

United States Defensive Publication [19] (H) [11] T100,502

Kobashi et al. [43] Apr. 7, 1981

[54] ELECTRONIC IGNITION CONTROL APPARATUS

[76] Inventors: Mamoru Kobashi, 270-2, Aza Iwane, Oaza Iwasaki, Nishin-cho, Aichi-gun, Aichi-ken, Japan, 470-01; Toru Kawase, 1-1, 3-chome, Hirayama-cho, Toyota-shi, Aichi-ken, Japan, 471; Tadashi Hattori, 2-66, Aza Kuyobo, Shinden-cho, Okazaki-shi, Aichi-ken, Japan, 444-31; Yoshiki Ueno, 100-6, Aza Hosoi, Oaza Hishiike, Koda-cho, Nukata-gun, Aichi-ken, Japan, 444-01

[21] Appl. No.: 58,923

[22] Filed: Jul. 19, 1979

[30] Foreign Application Priority Data

Jul. 20, 1978 [JP] Japan ..... 53-89193

[51] Int. Cl.[3] ..... F02P 5/04

[52] U.S. Cl. ..... 123/416; 123/418

[57] ABSTRACT

An electronic ignition control device for determining and maintaining a vehicle at the optimum spark advance for different ranges of crankshaft rotation speeds and ratios of air intake to crankshaft rotation speed. Signals indicating a range in which the instantaneous rotation speed falls and a range in which air intake/speed ratio falls define a ROM address at which is stored an optimum spark advance angle for that combination of ranges. The signal indicating the stored angle is applied to a discriminator which also receives inputs from a crank switch monitor, a throttle switch monitor and a coolant temperature sensor. When cranking or idling is detected, the discriminator substitutes a cranking advance or idling advance angle for the stored optimum advance angle signal.

1 Claim, 4 Sheets Drawing,

24 Pages Specification

The file of this unexamined application may be inspected and copies thereof may be purchased (849 O.G. 1221, Apr. 9, 1968).

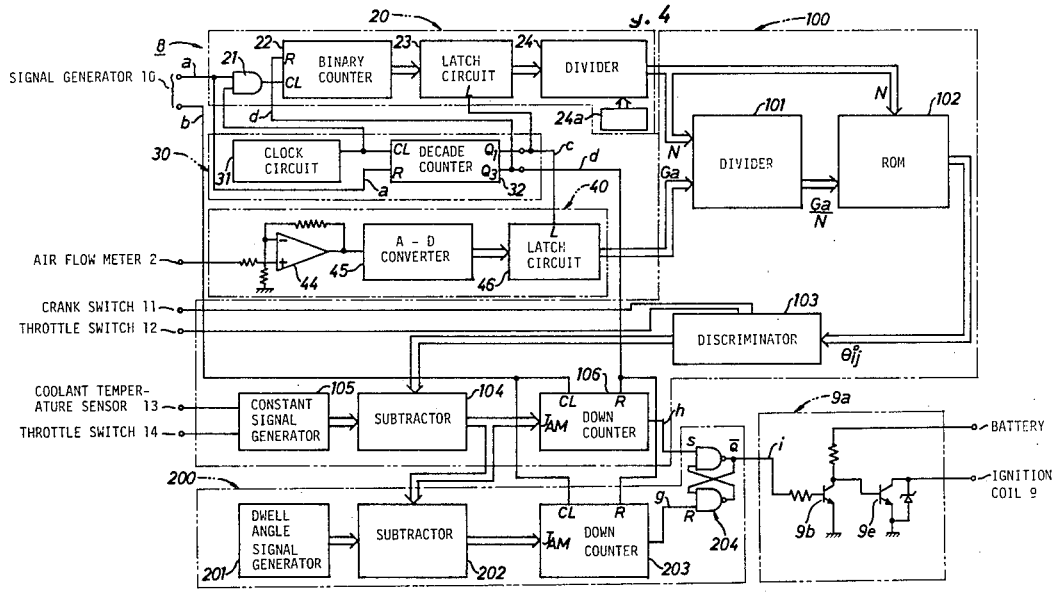

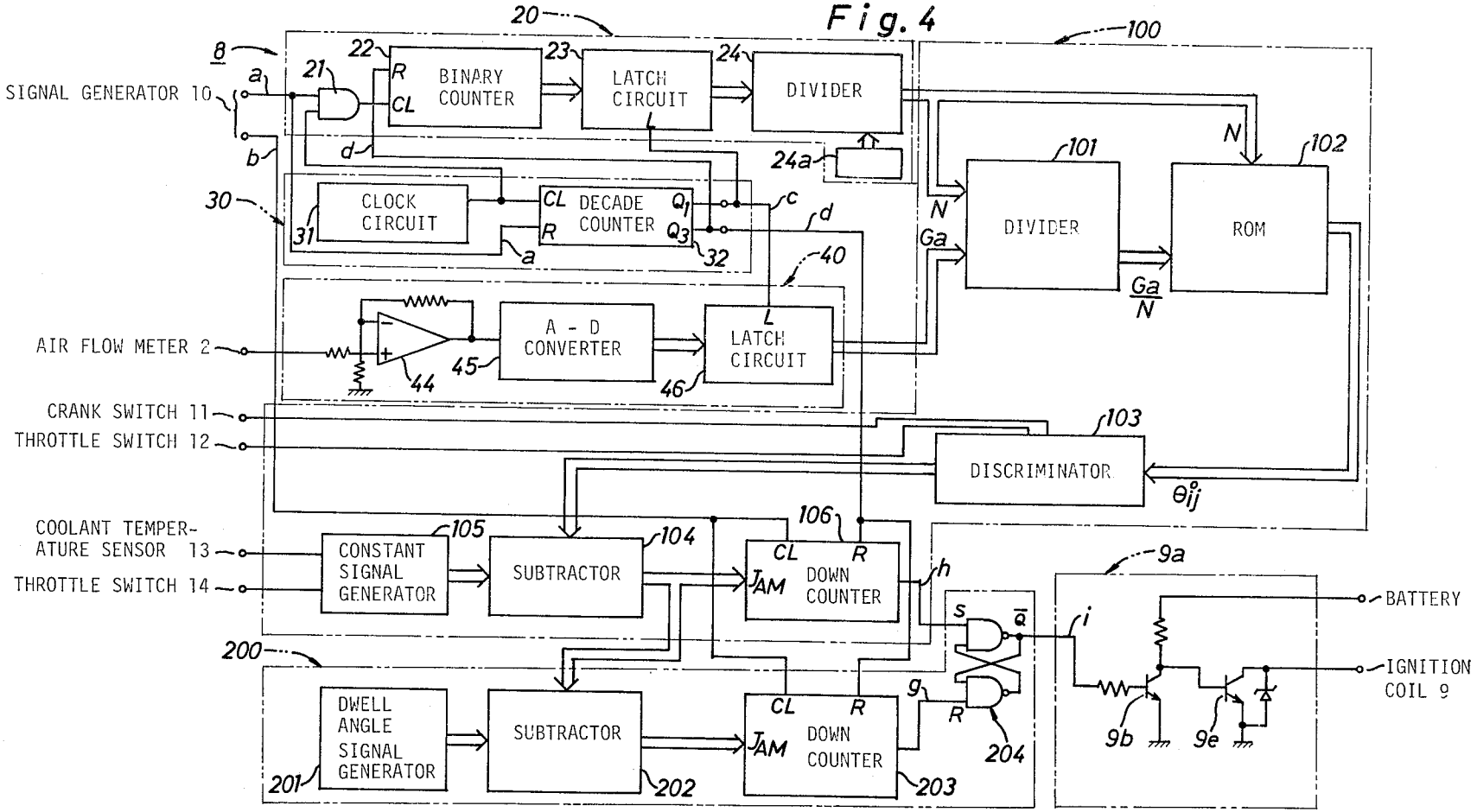
Fig. 4
100
ROM
102
DIVIDER
101
DISCRIMINATOR
103
BATTERY
IGNITION COIL 9
9a
9b
9e
204
203
202
201
200
DIVIDER
24a
LATCH CIRCUIT
24
BINARY COUNTER
23
20
22
21
8
DECADE COUNTER
32
CLOCK CIRCUIT
31
30
40
LATCH CIRCUIT
46
A - D CONVERTER
45
44
DOWN COUNTER
106
SUBTRACTOR
104
CONSTANT SIGNAL GENERATOR
105
DOWN COUNTER
SUBTRACTOR
DWELL ANGLE SIGNAL GENERATOR
SIGNAL GENERATOR 10
AIR FLOW METER 2
CRANK SWITCH 11
THROTTLE SWITCH 12
COOLANT TEMPER-ATURE SENSOR 13
THROTTLE SWITCH 14